US012333856B1

United States Patent
Livitz et al.

(10) Patent No.: US 12,333,856 B1
(45) Date of Patent: *Jun. 17, 2025

(54) SYSTEM AND METHOD FOR ACCESS CONTROL USING A PLURALITY OF IMAGES

(71) Applicant: Wicket, LLC, Cambridge, MA (US)

(72) Inventors: Gennady Livitz, Belmont, MA (US); Patrick L. Quinlan, Brooklyn, NY (US); Yann Henon, Somerville, MA (US); Robert Banks, North Wales, PA (US); Kelly A. Bucey, Doylestown, PA (US); Robert R. Seaner, Jr., Doylestown, PA (US); Sanjay Manandhar, Cambridge, MA (US); Samson Timoner, Cambridge, MA (US)

(73) Assignee: WICKET, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,403

(22) Filed: Nov. 28, 2023

Related U.S. Application Data

(63) Continuation of application No. 18/146,420, filed on Dec. 26, 2022, now Pat. No. 11,837,018, which is a
(Continued)

(51) Int. Cl.
*G06V 40/16* (2022.01)
*G06F 18/22* (2023.01)
*G06V 10/98* (2022.01)
*G06V 40/60* (2022.01)
*G07C 9/00* (2020.01)

(52) U.S. Cl.
CPC ............ *G06V 40/172* (2022.01); *G06F 18/22* (2023.01); *G06V 10/993* (2022.01); *G06V 40/166* (2022.01); *G06V 40/67* (2022.01); *G07C 9/00563* (2013.01)

(58) Field of Classification Search
CPC .... G06V 40/172; G06V 40/166; G06V 40/67; G06V 10/993; G06F 18/22; G07C 9/00563
See application file for complete search history.

(56) References Cited

U.S. PATENT DOCUMENTS

2016/0179191 A1* 6/2016 Kim ........................ G06F 3/012
345/173

* cited by examiner

*Primary Examiner* — Casey L Kretzer
(74) *Attorney, Agent, or Firm* — Davis Malm D'Agostine PC; David J. Powsner

(57) ABSTRACT

Aspects of the invention provide a method of face recognition that includes receiving plural frames of a video stream imaging a candidate individual, e.g., in the field of view of a camera, and generating for each of those frames a score of the image and/or of the candidate therein. This can include a score (or count) indicative of the number of individuals present in the frame, a pose of the candidate individual (e.g., face-on or otherwise), blur in the image, and so forth. The method further includes selecting, based on the respective scores of the frames, a subset of the frames for matching by a face recognizer against a set of one or more images of designated individuals. That set may be of individuals approved for access, individuals to be prevented for access, or otherwise. An output can be generated based on such matching by the face recognizer.

22 Claims, 1 Drawing Sheet

Related U.S. Application Data continuation of application No. 17/241,223, filed on Apr. 27, 2021, now Pat. No. 11,544,965, which is a continuation-in-part of application No. 16/679,021, filed on Nov. 8, 2019, now Pat. No. 11,132,532, which is a continuation-in-part of application No. 16/409,422, filed on May 10, 2019, now Pat. No. 11,010,597.

(60) Provisional application No. 63/016,957, filed on Apr. 28, 2020, provisional application No. 62/758,268, filed on Nov. 9, 2018, provisional application No. 62/669,698, filed on May 10, 2018.

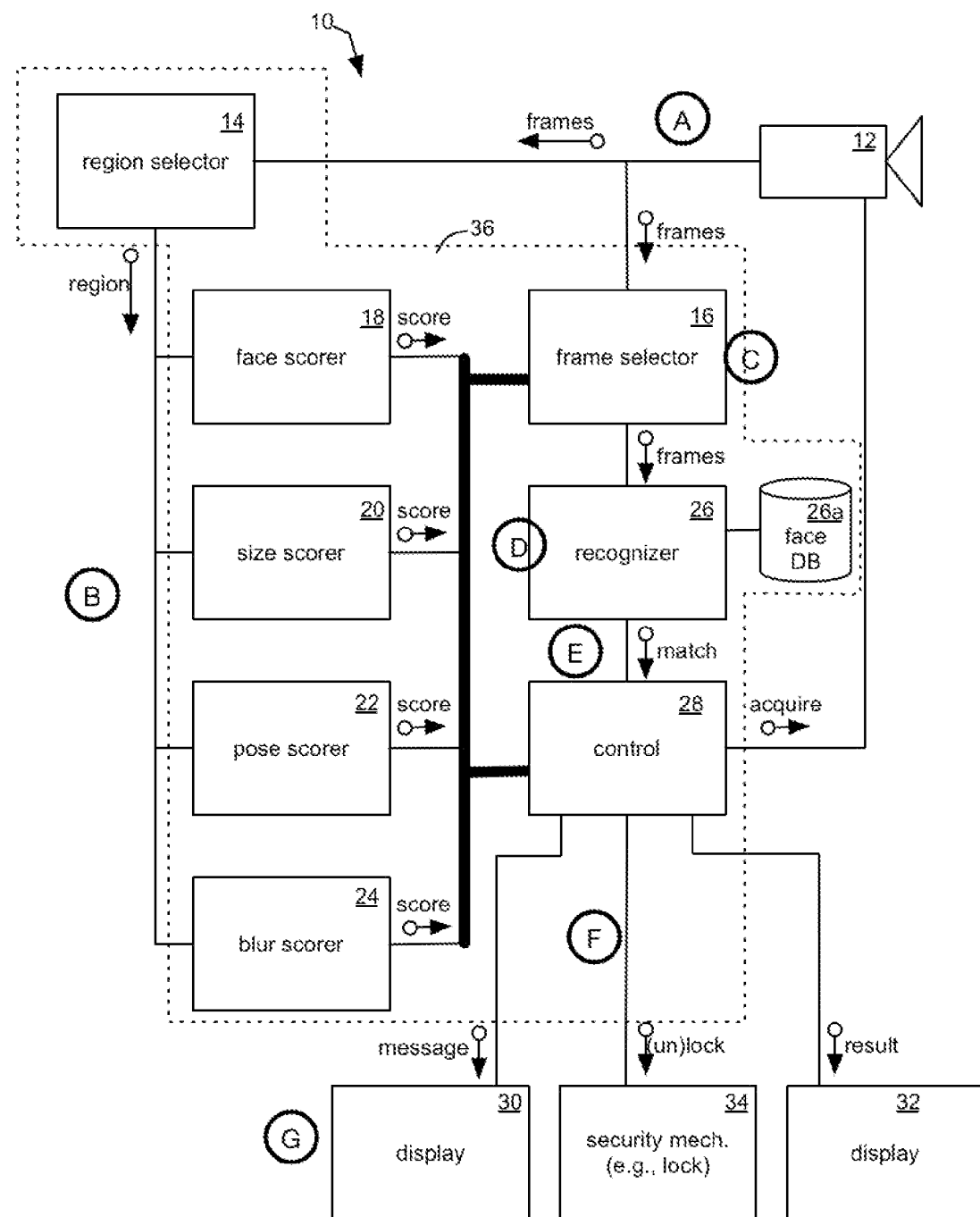

SYSTEM AND METHOD FOR ACCESS CONTROL USING A PLURALITY OF IMAGES

REFERENCE TO RELATED APPLICATIONS

This application is a continuation of U.S. patent application Ser. No. 18/146,420, filed Dec. 26, 2022, entitled SYSTEM AND METHOD FOR ACCESS CONTROL USING A PLURALITY OF IMAGES. U.S. patent application Ser. No. 18/146,420 is a continuation of U.S. patent application Ser. No. 17/241,223, filed Apr. 27, 2021, entitled SYSTEM AND METHOD FOR ACCESS CONTROL USING A PLURALITY OF IMAGES. U.S. patent application Ser. No. 17/241,223 claims the benefit of priority of U.S. Provisional Patent Application Ser. No. 63/016,957, filed Apr. 28, 2020, entitled SYSTEM AND METHOD FOR ACCESS CONTROL USING A PLURALITY OF IMAGES. U.S. patent application Ser. No. 17/241,223 is a continuation in part of commonly assigned U.S. patent application Ser. No. 16/679,021, filed Nov. 8, 2019, now U.S. Pat. No. 11,132,532, issued Sep. 28, 2021, entitled SYSTEM AND METHOD FOR FACIAL RECOGNITION ACCURACY. U.S. patent application Ser. No. 16/679,021 claims the benefit of filing of U.S. Provisional Patent Application Ser. No. 62/758,268, filed Nov. 9, 2018, entitled SYSTEM AND METHOD FOR FACIAL RECOGNITION ACCURACY. U.S. patent application Ser. No. 16/679,021 is a continuation in part of commonly assigned U.S. patent application Ser. No. 16/409,422, filed May 10, 2019, now U.S. Pat. No. 11,010,597, issued May 18, 2021, entitled DIGITAL DATA SYSTEMS AND METHODS USING FACIAL RECOGNITION. U.S. patent application Ser. No. 16/409,422 claims the benefit of filing of U.S. Provisional Patent Application Ser. No. 62/669,698, filed May 10, 2018, and entitled "Use of Facial Recognition to exclude Persons of Interest from High Value Events or High Value Venues." The teachings of all of the foregoing applications and patents are incorporated herein by reference.

BACKGROUND OF THE INVENTION

The invention relates to digital data processing, digital image analysis, facial recognition and computer-mediated security systems. The invention has application, by way of non-limiting example, in access control, including permitting or denying persons access to resources, such as gated entrances, and locked rooms.

A problem for home- and business-owners alike is determining whom to permit to enter premises and whom to exclude. Security to control access to a premises or other resource can be done in a variety of ways including combination locks, keys, and electronic badges. For the methods mentioned, the combination, key, badge or other token necessary to gain entry can be surreptitiously shared, allowing access to persons who should not have it. Alternative systems for access control rely on biometric markers, e.g., physiological attributes of individual "key holders" that cannot be easily shared, e.g., fingerprints, voice prints, and so forth.

Facial recognition, the computer-based, automated process of identifying people from their images, has become an increasingly popular mechanism for access control. This is, in part, because of the intuitive nature of the identification being performed and, in part, because it lends itself to being double-checked, whether by security guards present at the access point or by viewing video footage afterwards. Reliably detecting and recognizing faces by computer, however, can be challenging for a number of reasons, including, but not limited to, poor camera quality and positioning, bad lighting, and so forth. And, while spending more on cameras (e.g., to improve their quality and increase their number), lighting and computer resources can overcome these challenges, it is . . . well . . . more expensive.

An object of the invention is to provide improved systems, apparatus, and methods for digital data processing, digital image analysis, facial recognition and computer mediated security for access control.

A further object is to provide such systems, apparatus, and methods as are suitable for use in homes, businesses, public and private events and other applications.

Yet still further objects of the invention are to provide such systems, apparatus and methods as can be implemented at low cost.

SUMMARY OF THE INVENTION

The foregoing are among the objects obtained by the invention which provides, in some aspects, a method of access control that includes receiving plural frames of a video stream imaging a candidate individual, and generating, for each of those frames, one or more scores of the image and/or of the candidate therein. This can include, for example, a score indicative of whether there is more than one individual present in the frame, a score indicative of a pose of the candidate individual in the frame (e.g., face-on, profile, or otherwise), a score indicative of a degree of blur in the image, and so forth.

The method further includes selecting, based on the respective scores of the frames, a subset to apply to a face recognizer, which matches the selected frames against a database or other set of previously-acquired images. Those may be of individuals approved for access, individuals to be prevented from access, or otherwise. An output generated by the face recognizer based on such matching, is used, according to some aspects of the invention, to actuate an electro-mechanical, magneto-mechanical, optical-mechanical or other security mechanism, thereby, permitting (or preventing) the candidate individual access to a secured room, facility or other resource.

Further aspects of the invention provide a method, e.g., as described above, that includes messaging the candidate individual if a score of a frame is in a designated range. In related aspects of the invention, the message is a directive that is based on that score. Thus, for example, according to further related aspects of the invention, the method includes messaging the candidate individual to modify his/her pose, if a score of a frame indicates that he/she is looking away from the camera, looking down, or otherwise. Other related aspects of the invention include messaging the individual to alter his/her position, to separate himself/herself from a group of individuals and/or to remove sunglasses, a mask, cap or other paraphernalia tending to obscure the face.

Other aspects of the invention provide methods, e.g., as described above, that include selecting more than one but less than all of the frames for matching by the face recognizer.

Still yet other aspects of the invention provide methods, e.g., as described above, that include defining a target number of frames and invoking the face recognizer only after that many frames have been selected. Related aspects of the invention provide such methods, e.g., as described above, in which the face recognizer is invoked-even if the number of frames selected is shy of the target number-upon expiration of a designated time interval, or other condition indicating that a response is desired more quickly.

Still other aspects of the invention provide methods, e.g., as described above, that include activating any of electromechanical, magneto-mechanical, and optical-mechanical security mechanism based on matching by the face recognizer These and other aspects of the invention are evident in the description, drawings and claims hereof.

BRIEF DESCRIPTION OF THE DRAWINGS

A more complete understanding of the invention may be attained by reference to the drawings, in which:

FIG. 1 depicts a system and method for access control according to the invention.

DETAILED DESCRIPTION OF THE DRAWINGS

Architecture

FIG. 1 depicts a system, apparatus and method according to one practice of the invention for access control using face recognition. The system 10 includes a video camera 12 that is coupled to a frame selector 16 which, in turn, is coupled to a face scorer 18, a size scorer 20, a pose scorer 22 and a blur scorer 24. The scorers are coupled to a frame selector 26 and to a control 28 that is, in turn, coupled to a security mechanism 34 and one or more displays, here, displays 30, 32. The frame selector 16 is a also coupled to a face recognizer 26, which too is coupled to control 28. An optional region selector 14 is interposed between the camera 12 and the scorers 18-24, as shown.

In the illustrated embodiment, elements 14-28 are implemented in software that executes on a digital data processor 36, which can be a workstation, desktop, laptop, micro, embedded or other general- or special-purpose computing device of the type that is (i) commercially available in the marketplace or otherwise known in the art, as adapted in accord with the teachings hereof, and (ii) that may incorporate one or more graphics processing units (GPU) or other hardware and/or software suited to image processing and/or deep neural networks, including by way of non-limiting example, the TPU (Google Inc, Mountain View, CA) or CoreML (Apple Inc., Cupertino CA) or the Movidius chip (Intel Inc. Santa Clara, CA), again, all as adapted in accord with the teachings hereof.

Other embodiments may vary in one or more of these regards. Thus, for example, elements 14-28 may execute in distributed fashion across multiple devices be they general-purpose computers, special-purpose logic, or otherwise, as is within the ken of those skilled in the art in view of the teachings hereof.

Coupling between such multiple devices, in embodiments that utilize them, can be via local area network (LAN), Internet, and/or other communications media (wireless or wired) of the type commercially available in the marketplace or otherwise known in the art, as adapted in accord with the teachings hereof. This is likewise true of coupling between video camera 12 and digital data processor 36, as well as between it and displays 30, 32 and security mechanism 34.

Device 12 is a video camera or other image acquisition device (hereinafter, "video camera" or, simply, "camera") that generates a video stream of images ("frames") showing a person—hereinafter referred to as the "candidate" individual—nearing and/or near a resource or access point (such a door or turnstile, gated entrance, locked room, or so forth). See reference numeral (A) in the figure, hereinafter (like its brethren) "Step (A)." Camera 12 can be a conventional security camera of the type commercially available in the marketplace or otherwise known in the art, as adapted in accord with the teachings hereof, though, in other embodiments other image acquisition devices suitable for acquiring frames of a scene may be used instead. In embodiments in which the candidate individual is expected to walk toward the access point, the camera 12 is preferably selected, disposed and/or aimed to minimize the effect of blur on acquisition of images of the individual. And, although, only one device 12 is shown in the drawing, it is within the ken of those skilled in the art to use multiple such devices (e.g., at different vantage points) in view of the teachings hereof—e.g., thereby providing for the generation of frames with more fulsome images of the candidate individual's face, regardless of pose, obstructions or otherwise. Moreover, although shown independently, here, in some embodiments, camera 12 may be co-housed with displays 30, 32, control 28 and/or digital data processor 36, all as is within the ken of those skilled in the art in view of the teachings hereof.

Frame Selection

Scorers 18-24 of the illustrated embodiment generate scores for each of the frames in the video stream received from the video camera 12. See Step (B). The scores can be indicative of characteristics the frame and/or, more particularly, of the image of the candidate individual himself/herself therein. And, although the embodiment illustrated here and described below includes a face, size, pose and blur scorer, it will be appreciated that other embodiments may vary in this regard, e.g., incorporating a greater or lesser number of detectors, incorporating other detectors instead or in addition, or otherwise, all as is within the ken of those skilled in the art in view of the teachings hereof. For example, some embodiments utilize only pose and size detectors, since they can in some instances be sufficient for adequate frame selection, and eschew blur detection, again, all by way of example.

To speed and focus operation of the scorers 18-24, region selector 14 is employed in the video stream pathway from camera 12, as shown. In this optional step, the selector 14 crops the incoming frames, limiting the portions on which the scorers 18-24 operate to an area of interest (e.g., near the access point) in the camera 12 field of view, which can be determined empirically or otherwise, e.g., during system setup. This has the benefit of eliminating from the frames faces or other elements that may slow operation of the scorers 18-24, in addition to facilitating identifying images of the candidate individual.

To this end, face scorer 18 of the illustrated embodiment comprises a conventional face detector of the type commercially available in the marketplace and/or otherwise known in the art, as adapted in accord with the teachings hereof. The scorer 18 of the illustrated embodiment-which may be, for example, an MTCNN face detector-generates a score indicative of a number of individuals in the frame or a region thereof (hereinafter, for simplicity, a "frame"). In other embodiments, the score may be a value indicating whether one (and only one) individual is imaged in the frame, or otherwise.

Illustrated size scorer 20 can, likewise, comprise a conventional face detector of the type commercially available in the marketplace and/or otherwise known in the art, as adapted in accord with the teachings hereof. The scorer 20 of the illustrated embodiment (which, too, may be an MTCNN face detector, or otherwise) generates a score indicative of a measure or other characteristic of a face (presumably, for example, that of the candidate individual)

in the frame. This is preferably, for example, an interocular distance, though it can be a face width and height, or otherwise. And, though that score can reflect such dimension (or dimensions) in pixels or otherwise, in some embodiments, it is a closeness of that/those dimension(s) to the maximal effectiveness range of the recognizer 26. Such a range can be determined empirically, e.g., through testing of sample images, or otherwise, as is within the ken of those skilled in the art in view of the teachings hereof.

If multiple faces are imaged in the frame (e.g., the candidate individual and others), element 20 can generate as the score an array, linked list or other collection reflecting the dimension(s) of each respective face in the image (along with an ID of that face, e.g., returned by the face detector that makes up the scorer 20 or otherwise) for use by the frame selector 16 and/or recognizer 26 in discriminating among face(s) in the image to be analyzed and those to be ignored (e.g., as representing persons distant from the camera 12).

Pose scorer 22 can, likewise, comprise a conventional face detector of the type commercially available in the marketplace and/or otherwise known in the art, as adapted in accord with the teachings hereof. It generates a score indicative of the pose of the head of the individual (presumably, for example, that of the candidate individual) in the frame. In the illustrated embodiment, that score can comprise the angle of the head in each of three dimensions, e.g., as determined from the relative positions of facial landmarks returned by the face detector that makes up the scorer 22 or otherwise. Alternatively, or in addition, the scorer 22 can comprise an enumeration (e.g., "acceptable," "poor," or otherwise, by way of non-limiting example) based on ranges of such angles that are suitable for face recognition by recognizer 26, or otherwise. In this latter regard, it will be appreciated that facial recognition algorithms are typically more effective with a person looking straight at the camera and, often, drop off steeply in effectiveness with faces in full profile, rather than fully frontal.

If multiple faces are imaged in the frame, element 22 can generate as the score an array, linked list or other collection reflecting the pose of each respective face in the image (along with an ID of that face, e.g., returned by the face detector that makes up the scorer 22 or otherwise) for use by the frame selector 16 and/or recognizer 26 in discriminating among face(s) in the image to be analyzed and/or those to be ignored.

Illustrated blur scorer 24 comprises conventional such functionality of such type known in the art suitable for generating a measure or other characterization of blur in an image. Scorer 24 of the illustrate embodiment generates that measure as the sum squares of a Laplacian digital filter computed across the face (presumably of the candidate individual) shown in the image and/or across the image itself. Other embodiments may use other measures of blur, instead or in addition. Regardless, the score generated by element 24 may be the absolute measure generated as a result of the aforesaid techniques or an enumeration based thereon (e.g., "acceptable", "poor", or otherwise, by way of non-limiting example) based on the degree of image clarity required for operation of recognizer 26.

Once scored by elements 18-24, frame selector 16 winnows frames received from the video camera 12 so that only a subset are invoked for processing by face recognizer 26, which is one of the embodiment's more computationally-intensive components. To that end, selector 16 selects a subset of the frames generated by camera 12 (e.g., at least one such frame but fewer than all frames) for application to and matching by face recognizer 26. See Step (C). In the illustrated embodiment, such winnowing/selection is based on the scores of each respective frame generated by scorers 18-24.

To this end, illustrated frame selector 16 generates, from the individual face, size, pose and blur scores generated for each frame in step (B), a composite score for each of the frames for which those scores were generated and, based on those composite scores, selects the corresponding frame for processing by the face recognizer 26. In embodiments in which multiple such scores are generated in step (B), the composite score can be the multiplicative product of the individual scores for that frame. In some embodiments, this includes binning each individual score, assigning values to the respective bins, summing or multiplying those values, and normalizing the result. In other embodiments, other methods of compositing the individual frame scores can be used (ignoring the blur score, for example), all as is within the ken of those skilled in the art in view of the teachings hereof. As discussed below and otherwise evident to those skilled in the art in view of the teachings hereof, the composite score can be used to determine messaging (if any) to the individual/candidate, e.g., requesting that he/she reposition himself/herself, etc., to permit better image acquisition and recognition.

Frame selector 16 selects frames until a suitable plurality of them, M, having a threshold minimum composite score of k1 are identified. In the illustrated embodiment, M has a value of seven, though, other embodiments may vary in this regard. In some embodiments, if a count, N (e.g., three or such other number as is implementation dependent), of the frames exceed a second higher threshold, k2, the frame selector 16 can also deem a suitable number of frames to have been acquired, where k1<k2 and N<M. In practice, achieving such a suitable plurality can sometimes take too long given the operational constraints placed on the implementation, the patience of the candidate individuals, and so forth. Accordingly, in some embodiments, the frame selector 16 applies the designated number of frames to the face recognizer 26 for recognition, e.g., if a watchdog or other timer (not shown) reflects that a designated time interval (e.g., 1 second, in the illustrated embodiment, although some embodiments may vary in this regard) has passed since the candidate user has presented him/herself for recognition—even if not all of those frames achieve the threshold minimum composite score. In such instances, the frame selector 16 can signal controller 28 of the shortcoming so that it may message display 32 or otherwise.

When the composite scores of the frames are too low, the controller 28 can also send messages to a display 30—which, too, can be an LED, LCD or other display of the type commercially available in the marketplace or otherwise known in the art—directing the candidate individual to take an action that will improve the scores of newly acquired frames. See step (G). To this end, the controller 28 can, for example, message the candidate individual via display 30 to adjust their position so that they appear bigger to the camera, to modify the pose of their head, to separate him/herself from other individuals, to remove sunglasses, caps, scarves or other accessories tending to obstruct facial imaging. Such messaging can be explicit, e.g., the display of a textual message, or implicit, e.g., blinking a dot on the screen near the camera, generating an arrow on the screen pointing to the camera, and so forth.

The thresholds k1 and k2 can be determined empirically or otherwise in view of the specifics of the implementation, and can be pre-set (e.g., at the time of installation) and, optionally, adjusted by an operator on a periodic, sporadic or other basis, if at all. In the illustrated embodiment, in which the scores generated in step (B) are each between zero and one, an exemplary value for k1 can be 0.7 and an exemplary value of k2 can be 0.9, though, other embodiments may vary in these regards. Those skilled in the art will appreciate that still more (or less) than two thresholds can be employed as, more generally, can other mappings from composite score to number of frames. Such mappings can be determined empirically by analyzing many images or access attempts performed on a test system, or other means within the ken of those skilled in the art.

In some embodiments, k1 and/or k2 are adjusted in real-time by the controller 28 based, e.g., on feedback from an operator rejecting faces that the system 10 has approved for access, on equipment or environmental conditions resulting in excessively long delays in identifying selectable frames, and so forth, all as within the ken of those skilled in the art in view of the teachings hereof.

Face Recognition

Face recognizer 26 matches faces in the frames selected by selector 16 against a database 26a or other store of images (collectively, referred to, here, without loss of generality as a "database") of designated individuals. These may be individuals approved for access, individuals to be prevented from access, or otherwise. The recognizer, which may be of the variety commercially available in the marketplace or otherwise known in the art, as adapted in accord with the teachings hereof, can perform such matching, e.g., by using a convolutional neural network to convert each facial image to a vector, and comparing those vectors using a distance such as a cosine distance, or by other techniques within the ken of those skilled in the art as adapted in accord with the teachings hereof.

A preferred such recognizer 26 is constructed an operated in the manner of the element referred to as the "Recognizer" shown and described in incorporated-by-reference U.S. patent application Ser. No. 16/679,021, e.g., at FIG. 2 and the accompanying text at pp. 15, et seq., the optimization of which Recognizer is further described in that application, e.g., at pp. 19, et seq., under the heading "Using the Tracker (FIG. 1 E) to optimize the Recognizer (FIG. 1 G)" and at pp. 21, et seq., under the heading "Theory of Using Multiple Images To Increase The Probability of Positive Identification" and at pp. 24, under the heading "Integrating Classifier Output Over Immediate Past for Making Identification Decisions," and code excerpts for all of which are provided at pp. 24, et seq., under the heading "Example," all of the foregoing of which, too, are incorporated herein by reference.

Referring to step (E), recognizer 26 of the illustrated embodiment outputs those distances to controller 28, labeled, here, "match." Vectors that are closer than a distance threshold are a match. If a face from a frame matches multiple images from the database 26A, it can either be discarded, or the closer vector can be selected. As there are multiple images, more advanced matching algorithms can be used that utilize lower distance (or other matching) thresholds, such as taught in incorporated-by-reference U.S. Ser. No. 16/679,021, e.g., in the section entitled "Using the Tracker (FIG. 1 E) to optimize the Recognizer (FIG. 1 G)" and in the accompanying drawing, all of the foregoing of which, too, are incorporated herein by reference.

Depending on the match scores and, specifically, whether they are above a distance threshold (or "low water mark") value that can be set empirically or otherwise by an operator, by automated operation of the controller 28 or otherwise, the controller 28 can actuate the security mechanism 34 as per convention in the art as adapted in accord with the teachings hereof. See Step (F). It can also send a message to the display 32—which can be an LED, LCD or other display of the type commercially available in the marketplace or otherwise known in the art-signaling a security guard or other operator that access was accepted or rejected, again as per convention in the art as adapted in accord with the teachings hereof.

The controller 28 of the illustrated embodiment returns results with a low error rate, when the composite scores for the frames applied to the recognizer 26 are above the threshold minimum composite score, k1. In instances (of the type described previously) when those composite scores are lower than that composite score threshold, the controller 28 may adjust the distance threshold (or low water mark minimum) so that positive matches are near always correct, though, negative matches can be suspect. In this circumstance, the controller 28 can message video camera 12 to acquire more frames-though, in many embodiments, the camera, region selector, and scorers continue to run while the recognizer 26 is processing data so that if more frames are needed, they may be already collected.

A preferred controller 28 is implemented as a state machine, switching between several states as indicated, by way of non-limiting example along with respective state transitions, below:

1. Idle: Looking for the next face; waiting for a candidate to apply for access.
2. Tracking: Tracking a candidate in a region of interest near the access control point, but not yet submitted to the Recognizer
3. Identification In Progress: Selected Frames (16) from the frame selector have been submitted to the Recognizer (26). More frames are being collected to submit to the Recognizer if needed.
4. Waiting for tracking to end: The candidate has been rejected; waiting for them to leave the region of interest.
5. Waiting for Access Control (AC) Zone Cleared: The candidate has been accepted; waiting for them to leave the region of interest.

State Transitions:
(a) From Idle to Tracking: Detecting a new face in a selected frame, indicating a new candidate in the region of interest, and the face is not too large (See next transition).
(b) From Idle to Identification In Progress: Detecting a new face in a selected frame, indicating a new candidate, and detecting conditions for making final submission, e.g. the face is so large to indicate it is close to the access control point and thus a response is due quickly.
(c) From Tracking to Idle: The candidate has not been seen for sufficient number of frames to be considered lost, and not enough frames were collected for an initial submission of faces to the Recognizer (26).
(d) From Tracking to Identification In Progress: Detecting a face in a selected frame from an existing candidate, and either the (i) the composite score of the frames has stopped going up over a sufficient number of frames (5 is a reasonable number) or (ii) (i) the timer expired or (iii) the face is large indicating it is close to the access control point and thus a response is due quickly.
(e) From Tracking and from Identification In Progress to Waiting For Tracking End Receiving Access Denied event from the Recognizer.

(f) From Tracking and from Identification In Progress to Waiting For Zone Cleared: Receiving Access Granted from the Recognizer.
(g) From Waiting For Tracking End to Idle: The face, and therefore the candidate, is not seen for a sufficient number of frames to be considered lost.
(h) From Waiting For Zone Cleared to Idle: The face, and therefore the candidate, is not seen for a sufficient number of frames to be considered lost. Or, the candidate's face is so large as to be close enough to the access control point to be able to be ignored.

In addition to tracking and transitioning the states, the controller 28 controls operation of the system 10 in stopping or continuing to request more frames as follows:

(i) If sufficient number of frames (N, M) have been collected of the appropriate qualities (k1, k2), Grant Access if appropriate. If not, if the quality scores are still improving or the distances from the recognizer are decreasing, and the timer has not timed out, request more frames.
(ii) If the distances found are so high/row that a match is highly unlikely with sufficient number of frames, Deny Access/Grant Access immediately.
(iii) If a timer expires, and the distances currently found are too low, Deny Access.

In some embodiments, the controller 28 uses the following methodology to control messaging to the displays 30, 32 and to decide whether to signal the frame selector 16 to obtain more image frames from the scorers 18-24. This can be based on (i) individual scores provided by the scorers 18-24 via bus, network or other coupling (software or hardware), and/or (ii) composites of those individual scores, all as will be evident to those skilled in the art in view of the teachings hereof.

Controller Messaging:
  If desirable to collect more frames, optionally show messaging on the display including:
    Is the person too far?
      If they are too far and not moving closer, show a message to move closer
    Is the person too close?
      Show a message to move farther back.
    Is the person very blurry?
      Tell the person to stand still.
    Is the person looking to the side or up or down?
      Tell the person to look at the camera Control of Frame Collection:
  Collected at least N frames with minimum quality score above k2?
    If yes:
      If the composite scores aren't changing, done collecting frames.
      If the composite scores are changing significantly
        If out of time, done.
        If not out of time, collect more frames.
    If no, go to next step.
  Otherwise: Collected at least M frames with a minimum quality score above k1?
    If yes, Are the frame quality scores improving:
      If yes:
        If not out of time, collect more frames.
        If out of time, done.
      If no:
        If the composite scores aren't changing, collecting frames is done.
        If the composite scores are changing significantly
          If out of time, done.
          If not out of time, collect more frames
    If did not collect at least M frames, go to the next step.
  Otherwise, at least M frames with a minimum quality score above k1 were not collected.
    If not out of time, collect more frames.
    If out of time, reject candidate access.
      Not enough good data was collected to verify the person, and that might be because of a spoof attempt (e.g., someone is shining a light on the sensor to try and break it.)

Controller 28 of the illustrated embodiment need not wait for the recognizer 26 to finish processing frames to put up a message on display 30. Instead, it can respond to scores received from scorers 18-24 to generate such messages. For example, if controller 28 receives a message from the scorer 18 indicating that there is more than one person in the region selected by selector 14, it can immediately generate a message via display 30 directing the candidate individual to separate himself from others. (In embodiments that permit group access, the results of the face scorer can be ignored in this regard, though, a standard, off-the-shelf tracker may be required as part of the scorer to group scores together for the same face and, in such instance, the recognizer 26 would attempt to recognize all people in the group and respond accordingly).

As noted above, the number of images collected by the frame-selector 16 can be varied under control of the controller 28. The first goal is to collect fewer frames when possible, which minimizes the time required to access. The second goal is to collect more frames should it appear that more frames might succeed in creating a match.

In some embodiments, e.g., as discussed below, the controller 28 receives the output of the recognizer 26 for an initial (e.g., small) batch of frames, for example, only one or two frames. If the controller 28 determines there is a match, then security mechanism 34 unlocked without waiting for further frames to be collected. If the controller 28 determines that after the initial batch of frames there is no match, more frames can be requested from the frame selector 16 to potentially achieve a match. There are numerous criteria for the controller 28 to stop requesting frames. By way of non-limiting example, those criteria include: when a match is found resulting in an acceptance, when the distances returned by the recognizer 26 are sufficiently extreme that they are unlikely to improve (resulting in a rejection), when a certain number of frames is collected (e.g. 7), or when a certain amount of time has elapsed. In some embodiments, a timer is employed to gauge the candidate's speed of approach to an access point. In such embodiments, it may be beneficial for the controller to stop requesting frames in order to insure that it can make the necessary computations to provide a result in time for the candidate, if approved, to enter the access point, e.g., without breaking stride. For this variation, by way of non-limiting example, the system 10 can estimate the candidate's distance from the access point (e.g., using interocular distance or head size or otherwise) and, potentially, speed of approach, and can cease requesting frames in time to decide whether to approve or reject the candidate just prior to his/her time of reaching the access point. Other mechanisms for determining when to cease acquiring frames can be used instead or in addition (e.g., calibrating the system empirically based on trial and error). An additional criterion for the controller 28 to stop requesting frames is based on the change over time of the scores from the scorers 18-24. If those scores have stopped increasing, then the distances from the recognizer 26 will generally also stop increasing. That is, if a match is not found by the controller 28 and the distance to a match is a sufficient far, and the scores from the scores 18-24 have stopped increasing, then a candidate individual can be rejected. Conversely, if the scores improve sufficiently within a certain amount of time, then the controller 28 may request more frames to see if a match is formed. Note that, as an optimization, the frame-selector may choose to ignore frames where scores from the scores 18-24 are insufficiently different from previous frames, so that only frames whose scores have increased sufficiently are processed. This type of selection yields computational savings.

The scores from the scorers capture the cause of the majority of the variations in the distances from the recognizer 26, but not all of those variations. The remaining variations can be treated as noise, which some distances being a bit smaller and some a bit larger. Using that information, an additional criterion for the controller 28 to stop requesting frames is based on the change over time of the distances from the recognizer 26. If the distances are large enough or small enough, the controller 28 can safely accept or reject. In an in-between range, the controller 28 can collect more images. The noisy distances can potentially yield a distance from the recognizer 26 that will yield a match.

In a slight variation, the frame selector 16 can accept all frames after an initial quality is met. By way of non-limiting example, the initial condition might be that the candidate individual is large enough in the frame, and the pose quality is high enough. The controller 28 receives the output of the recognizer. If the controller determines there is a match, then access may be granted via security mechanism 34. If the controller determines there is no match, rather than rejecting the individual, the controller controls the frame selector 16 and the recognizer 26 to process more frames. If the scores from the scores 18-24 do not improve after a certain number of frames, or a certain amount of time, the candidate individual is rejected.

In practice, a controller 28 uses multiple of the above criteria. By way of non-limiting example, if the scores from the scorers 18-24 are improving, or the distance from the recognizer 26 are becoming closer to a match, more frames may be collected.

In some embodiments, it was noted there are circumstances where using standard tracking algorithms to associate faces in frames to the same candidate individual. tracking by tracking faces, typically done using face detection. It will be appreciated by those with skilled in the art that one can use other sorts of detectors, which without limitation includes a head detector, a body, or a body detector and a face detector together. A body detector may be particularly useful because a camera may not be able to see the face of a candidate individual at all times.

Described herein are embodiments of the invention meeting the objects set forth above. It will be appreciated that these are merely examples of the invention and that other embodiments may incorporate changes to those herein within the ken of those skilled in the art. Thus, for example, it will be appreciated that although displays 30 and 32 for messaging the candidate individual and operator, respectively, are shown here separately, they may, in fact, comprise one and the same display. Moreover, although, those displays 30, 32 are used in the illustrated embodiment for messaging, alternate embodiments may perform messaging through bells, lights, whistles, and so forth.

In view of the foregoing, what we claim is:

1. A method of face recognition, comprising
   A. receiving a plurality of frames of a video stream imaging a candidate individual in a field of view of a camera,
   B. generating for each of the plurality of frames one or more scores of the frame and/or of the candidate individual imaged therein,
   C. selecting fewer than all of the plurality of frames for matching by a face recognizer, where such selection is based on one or more of the scores of each respective frame, where the selecting step includes selecting frames until each of M frames have a composite score of at least k1, where the composite score of a frame is a composite of the one or more scores generated for that frame in Step (B),
   D. invoking the face recognizer on the selected frames to match the candidate individual imaged therein against a set of one or more designated individuals and to generate a match score indicative of a closeness of match,
   E. generating an output indicative of approval or denial of the candidate individual based on comparison of said match score generated by the face recognizer with a low watermark value, and
   F. adjusting
      (i) k1 in real-time based on feedback rejecting candidates for which output indicating approval has been generated for access in Step (E), and
      (ii) the low water mark value to improve the correctness of outputs indicative of approval generated in step (E).

2. The method of claim 1, wherein step (B) includes messaging the candidate individual if any of
   (i) a score, and
   (ii) a composite of multiple scores
   is in a designated range.

3. The method of claim 2 comprising messaging the candidate individual using a directive that is based on any of the score and the composite.

4. The method of claim 3 comprising messaging the candidate individual to modify his/her pose.

5. The method of claim 3 comprising messaging the candidate individual to alter his/her position.

6. The method of claim 3 comprising messaging the candidate individual to separate himself/herself from a group of individuals.

7. The method of claim 3 comprising messaging the candidate individual to remove face-obscuring gear.

8. The method of claim 7 comprising messaging the candidate individual to remove any of a hat, mask and/or glasses.

9. The method of claim 1, wherein step (C) includes selecting fewer than all of the plurality of frames but more than one frame for matching by a face recognizer.

10. The method of claim 1, comprising
    defining a target number of frames, and
    in step (D), invoking the face recognizer on the selected frames upon selection in step (C) of the target number of frames.

11. The method of claim 1, comprising the steps of
    defining a target time interval,
    defining a target number of frames, and
    in step (D), invoking the face recognizer on the selected frames upon an earlier of
    (i) expiration of the time interval and
    (ii) selection of the target number of frames.

12. The method of claim 1,
defining a target time interval,
in step (D), invoking the face recognizer on the selected frames upon expiration of the time interval, and
executing steps (A)-(C) to acquire and select additional frames imaging the candidate individual, after invoking the face recognizer upon expiration of the time interval.

13. The method of claim 1 comprising responding to absence of matching by the face recognizer by messaging the candidate individual.

14. The method of claim 13 comprising messaging the candidate individual using a directive that is selected based on one or more of the scores of the frames in which no matching face was recognized.

15. The method of claim 1, wherein step (B) includes generating for each of the plurality of frames a score indicative of a pose of the candidate individual in the frame.

16. The method of claim 1, wherein step (B) includes generating for each of the plurality of frames a score indicative of a measure of a face of the candidate individual in the frame.

17. The method of claim 1, wherein step (B) includes generating one or more scores of the frame based on regions of a scene imaged therein.

18. The method of claim 17, wherein step (B) includes generating for the frame a score indicative of a number of individuals in the region.

19. The method of claim 1, wherein step (B) includes generating for the frames a score indicative of blur.

20. The method of claim 1, comprising a step of activating any of electro-mechanical, magneto-mechanical, and optical-mechanical security mechanism based on matching of one or more of the selected frames by the face recognizer.

21. The method of claim 1, wherein the selection is based on a composite of the scores for each respective frame.

22. A system for face recognition, comprising
A. a camera,
B. a plurality of scorers coupled to the camera and receiving therefrom a plurality of frames of a video stream imaging a candidate individual in a field of view of the camera,
C. each scorer generating for each of the plurality of frames one or more scores of the respective frame and/or of the candidate individual imaged therein,
D. a frame selector coupled to the scorers, the frame selector selecting fewer than all of the plurality of frames for matching by a face recognizer, where such selection is based on one or more scores of each respective frame, where the frame selector selects frames until each of M frames have a composite score of at least k1, where the composite score of a frame is a composite of the one or more scores generated for that frame by the scorer,
E. the face recognizer coupled to the frame selector and matching the candidate individual, as imaged in a said respective frame, against a set of one or more images of designated individuals and to generate a match score indicative of a closeness of match,
F. a controller that is coupled to the face recognizer and to the frame selector and that generates an output indicative of approval or denial of the candidate individual based on comparison of said match score generated by the face recognizer with a low watermark value, and
G. wherein the controller adjusts
  (i) k1 in real-time based on feedback rejecting candidates for which output indicating approval has been generated for access in Step (E), and
  (ii) the low water mark value to improve the correctness of outputs indicative of approval generated in step (E).

* * * * *